Feb. 28, 1956  G. C. LA PORTE ET AL  2,736,622
LUBRICATING SYSTEM FOR JOURNAL BEARINGS
Filed March 15, 1954  2 Sheets-Sheet 1

INVENTOR
EDWIN W. TAYLOR
GEORGE C. LA PORTE
BY Scrivener and Parker
ATTORNEYS

Feb. 28, 1956   G. C. LA PORTE ET AL   2,736,622
LUBRICATING SYSTEM FOR JOURNAL BEARINGS
Filed March 15, 1954   2 Sheets-Sheet 2

INVENTOR
EDWIN W. TAYLOR
GEORGE C. LA PORTE
BY *Scrivener and Parker*
ATTORNEYS

United States Patent Office 2,736,622
Patented Feb. 28, 1956

2,736,622
LUBRICATING SYSTEM FOR JOURNAL BEARINGS

George C. La Porte and Edwin W. Taylor, Baltimore, Md.

Application March 15, 1954, Serial No. 416,236

18 Claims. (Cl. 308—86)

This invention relates to lubrication of rotatable shafts and their associated bearings and more particularly to a novel system which is especially adapted for the efficient lubrication of axle journals and bearings of railway cars. The present invention is an improvement on the lubricating system disclosed in our copending application Serial Number 341,804, filed March 11, 1953, for Journal Box Lubricating System.

In our prior application, the lubrication of the journal and bearing is achieved by raising oil, contained in a reservoir positioned at the bottom of the journal box, to the bearing by means of an oil conveying drum which is directly driven by the journal, and efficient lubrication at all speeds of rotation of the journal is secured through a novel construction of the oil conveying drum and associated parts.

One of the important objects of the present invention is to provide an improved and simplified oil conveying member for use in a lubricating system of the above type which will be effective to efficiently lubricate the bearing and journal irrespective of the speed of the latter.

During certain conditions of operation of railway cars, there sometimes occurs a misalignment of the journal with respect to the journal box so that these parts are displaced with respect to each other. Such relative displacement of the journal and journal box in installations where the oil conveying member is directly and rigidly secured to the journal, as in our prior application, might cause such member to be brought into contact with the side of the journal box and be damaged during continued rotation thereof by the journal.

It is therefore a further important object of the invention to provide a novel lubricating apparatus of the foregoing type which will avoid all possibility of damage to the rotatable lubricating member in the event of contact with the journal box during relative displacement between the journal and journal box.

A further object of the invention is to provide a novel torque limiting driving connection between the journal and oil conveying member which is so constituted that the drive between these parts will be interrupted in the event the member engages the journal box.

Another object is to provide in a lubricating apparatus of the above character, a clutch of deformable material such as rubber, between the journal and oil conveying member, the clutch being capable of adjustment so that it will slip and interrupt the drive between the journal and member in the event that a predetermined load is placed on the clutch, such as might be caused by engagement of the member with the journal box.

Other objects and novel features of the invention will appear more fully hereinafter from a consideration of the following detailed description when taken in connection with the accompanying drawings wherein a preferred embodiment of the invention is shown. It will be expressly understood, however, that the drawings are utilized for purposes of illustration only and are not designed as a definition of the limits of the invention, reference being had for this purpose to the appended claims.

In the drawings, wherein similar reference characters refer to similar parts throughout the several views.

Figure 1:
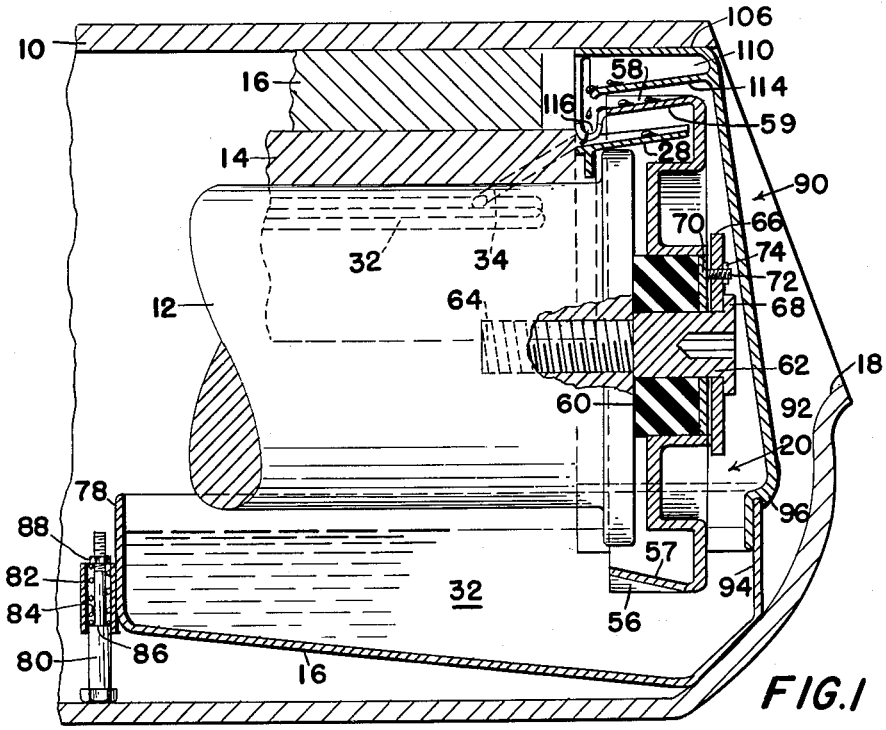
Fig. 1 is an axial sectional view of a car journal box and its associated journal and bearing and having the novel lubricating apparatus of the present invention associated therewith.

Referring more particularly to Fig. 1 of the drawings, the present invention is illustrated therein in connection with a journal, journal box and bearing of the type currently used on railway cars, although it will be understood that the invention is also capable of use for the efficient lubrication of other types of bearings and shafts or journals. More particularly, the journal comprises a journal box 10 having an axle journal 12 therein, the latter being provided with the conventional type of bearing brass 14 and wedge 16 at its upper portion. The journal box 10 is provided with an entrance opening 18 which is adapted to be closed by any suitable type of dust cover or shield, not shown.

The novel lubricating system of the present invention is of the free oiling type and includes a novel oil conveyor member 20 which is formed as a drum with a central hub portion 22 for drivably connecting the drum to the journal 12 in a manner which will appear more fully hereinafter. The drum 20 is provided with a peripheral flange 26 which, as illustrated in Fig. 1, is adapted to overlie an inclined ledge or oil conveying part 28 which is secured to the forward portion of the bearing 14 as by means of a plurality of screws 30, see Fig. 3. With such an arrangement, it will be readily seen that with the lower portion of the drum 20 submerged within the oil contained within a reservoir 32, any oil deposited from the drum 20 to the ledge 28 will be conducted from the latter to bearing grooves or slots 32 positioned on opposite sides of the bearing 14, see Fig. 2, through passages or channels 34. Thus, the inclined ledge 28, is positioned beneath the flange 26 of the drum 20 and conveys all oil conducted thereto, during operation of the journal 12, to the bearing grooves 32 for efficient lubrication of the journal.

One of the important features of the present invention resides in the novel construction of the oil conveyor or drum 20 and the parts associated therewith, so that efficient oiling of the journal 12 may be effected throughout all ranges of speed of the journal. This highly desirable result is secured by the novel drum construction illustrated in Figs. 1 and 4, when taken in connection with the structure shown in Fig. 3. More particularly, the drum 20 may be formed of metal or may be of a suitable plastic capable of being molded, and as shown, the periphery 26 of the drum 20 is provided with a plurality of circumferentially spaced slots or openings 36, 38, 40 and 42, such openings forming a plurality of arcuate drum sections 44, 46, 48 and 50 of substantially equal length. As will be clearly seen from Fig. 4, the two diametrically opposed ends of the drum sections 46 and 50 are directed inwardly toward the hub portion 22 to form triangular vanes 52 and 54 respectively, the leading edges of which face in the same direction of rotation of the drum. Likewise it will be seen that the opposite ends of the drum sections 46 and 50 are directed inwardly to form similarly shaped, diametrically opposed triangular vanes 56 and 58, the leading edges of these vanes facing in the same direction of rotation of the drum 20 but oppositely from the direction of vanes 52 and 54. As will appear more fully hereinafter, the vanes 52 and 54 both function to deliver oil from the reservoir 32 to the oil collecting ledge 28 during movement of the drum 20 in the direction of the arrow A as viewed in Fig. 4 and under certain speed conditions. On the other hand, the vanes 56 and 58 will function to deliver oil from the reservoir 32 to the ledge 28 when the drum 20 and journal 12 rotate in the opposite direction such as shown by the arrow B in Fig. 4.

All of the vanes heretofore referred to are formed in a novel manner so that efficient lubrication of the bearing 14 may be secured throughout low and intermediate speeds of the journal 12. For example, the tip portions of the vanes 52 and 54 are directed outwardly from the hub 22 to form inwardly inclined gutters or troughs 53 and 55 in the respective vanes. In like manner, the vanes 56 and 58 are formed with inwardly inclined gutters or troughs 57 and 59 and the operation of all these gutters of the respective vanes in the lubricating cycle will be referred to more particularly hereinafter.

With the drum construction heretofore described, it is desired to point out that the vanes 52, 54 and 56, 58 are effective to convey oil to the ledge 28 during all slow speeds of operation of the journal 12 in either of opposite directions. For example, and referring to Figs. 1 and 4, let it be assumed that the journal 12 and the drum 20 are rotated in the direction of the arrow A. As the vane 52 and the drum section 46 emerge from the oil bath, oil will cling, by capillary attraction, to both the inner and outer surfaces of the drum section 46 and the vane 52. As the section 46 and the vane 52 move upwardly, gravity acting upon the oil on such surfaces will cause the oil to flow to the vane 52 and as the latter passes over the ledge 28, the oil will flow down the gutter 53 and will be deposited upon the ledge 28 for passage to the bearing 14 and journal 12 through channels 34 and grooves 32. During the next half revolution of the drum 20, the oil will collect upon the opposite surfaces of the section 50 and will drip from the end of the gutter 55 in the vane 54 on to the ledge 28. On the other hand, should the journal 12 and the drum 20 be rotated in the opposite direction, such as indicated by the arrow B of Fig. 4, the oil will likewise coat both surfaces of the sections 46 and 50. As the section 46 rises from the oil bath, the oil held thereon by capillary attraction will flow to the vane 56 and will finally drip from the gutter 57 of such vane on to the ledge 28 when the vane overlies the ledge. This operation will also take place one-half revolution later when the vane 58 and gutter 59 overlie the ledge 28. Thus it will be seen from the foregoing that during slow speed operation of the journal 12 and the drum 20, the novel construction of the drum vanes and gutters will cause oil to be conveyed to the ledge 28 and thence to the journal and bearing each half revolution and regardless of the direction of rotation. The ready flow of the oil on both the inner and outer surfaces of the drum sections occurs through the action of gravity and the flow of oil from the exterior surfaces of the drum sections to the various vanes and from the gutters thereof to the ledge 28 is readily enabled by reason of the slots in the drum flange 26, such slots forming gaps or openings in the flange. Thus, the oil delivered by the vanes is that retained not only on the inner surface of the drum sections but also that retained on the outer surfaces thereof. Due to this construction, highly efficient delivery of oil is assured to the journal and bearing notwithstanding the fact that the drum rotates at relatively low speeds.

During certain intermediate speeds of operation of the journal 12 and the drum 20, the effect of the gravity flow of oil from the inclined gutters of the vanes 52, 54, 56 and 58 may be offset somewhat by the action of centrifugal force. In such event, the oil on the exterior and interior surfaces of the drum sections flows circumferentially past the gutters 53, 55, 57 and 59 to the slots or openings 40, 36, 38 and 42 and then drips by gravity upon the ledge 28. The circumferential width or extent of the aforesaid slots is such that with a given oil viscosity, dripping of the oil upon the ledge will be assured at such intermediate speeds of operation.

Figure 2:
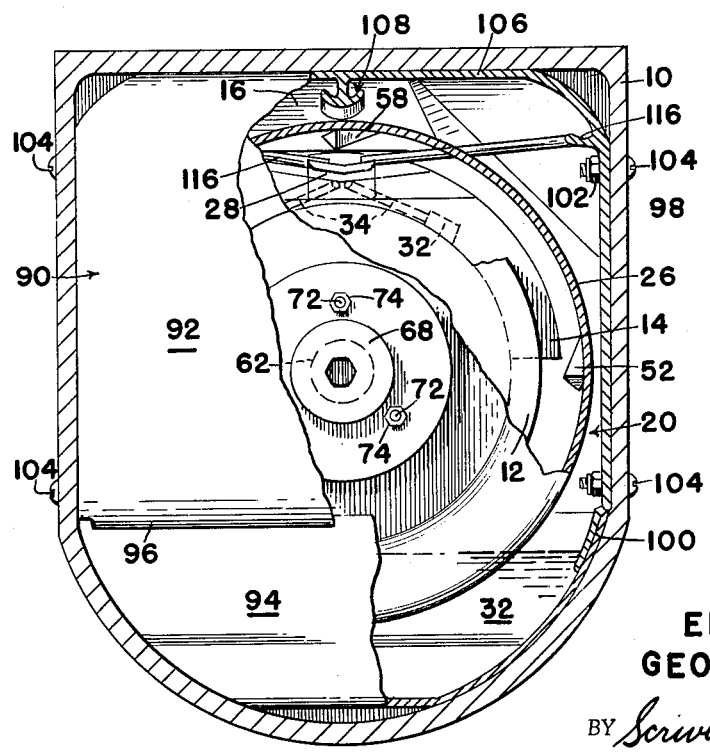
Fig. 2 is an end view of the journal box, partly in section and with certain parts broken away to more clearly illustrate the invention.

Referring more particularly to Fig. 2, it will be observed that the clearance between the flange 26 of the drum 20 and the side wall of the journal box 10 is relatively small so that in the event a relative lateral displacement of the journal 12 and box 10 occurs, the said flange 26 might engage such side wall and be damaged thereby should the driving connection between the journal and the drum be a rigid one. Means are accordingly provided by the present invention for avoiding any damage to the drum in the event that the foregoing engagement with the side of the journal box should occur, and in the form of the invention illustrated, such means includes a novel yieldable and releasable torque limiting driving connection or clutch in the form of a rubber or synthetic rubber collar 60. Such collar surrounds a bolt 62 and is housed within the hub portion 22 of the drum 20, the bolt 62 being threaded into a central tapped opening 64 provided in the end of the journal 12.

In order to adjust the clutch 60, an adjusting plate 66 is interposed between an enlarged head 68 on the bolt 62 and a disk 70 in engagement with the rubber collar, and a plurality of adjusting screws 72 provided with lock nuts 74 are threadedly received by the plate 66 and engage the disk 70. With such an arrangement, it will be readily understood that adjustment of the screws 72 will deform the rubber collar 60 in order to vary the frictional engagement between the collar 60 and the bolt 62 and between the collar 60 and the hub portion 22 and between the collar 60 and the end of the journal 12. Thus the torque transmission characteristics of the clutch may be readily adjusted so that it may slip and interrupt the drive to the oil conveying drum 20 upon any desired degree of overload. Hence, should the drum engage the journal box during operation of the apparatus, the clutch 60 will slip so that the drum will not be damaged.

The reservoir 32 for the oil, comprises a novel construction which is so arranged that it may be readily inserted through the opening 18 of the journal box 10 and placed in the position shown in Fig. 1, prior to the application of the drum 20 to the end of the journal 12. More particularly, and as shown in Figs. 1 and 2, the reservoir 32 includes an inclined bottom 76 which slopes toward the front of the journal box 10. The shortened rear face 78 which results from the inclination of the bottom 76 enables the reservoir to be inserted into position beneath the journal 12. In order to elevate the rear face 78 to the position shown in Fig. 1, after the reservoir is in position, the invention provides a collapsible resilient support including a supporting bolt 80 which projects through a casing 82 secured to the face 78. A spring 84 is interposed between the top of the casing 82 and a shoulder 86 on the bolt 80 to normally urge the rear portion of the reservoir 32 upwardly, the limit of such upward movement being adjustable as by means of a nut 88 threadedly received by the bolt 80 and bearing against the top of the casing 82. Thus, the spring 84 may be compressed when the reservoir 32 is placed in position so that the bolt 80 will clear the inner surface of the front wall of the journal box 18. Thereafter, when the reservoir 32 is in position, the parts assume the relationship illustrated in Fig. 1.

Figure 3:
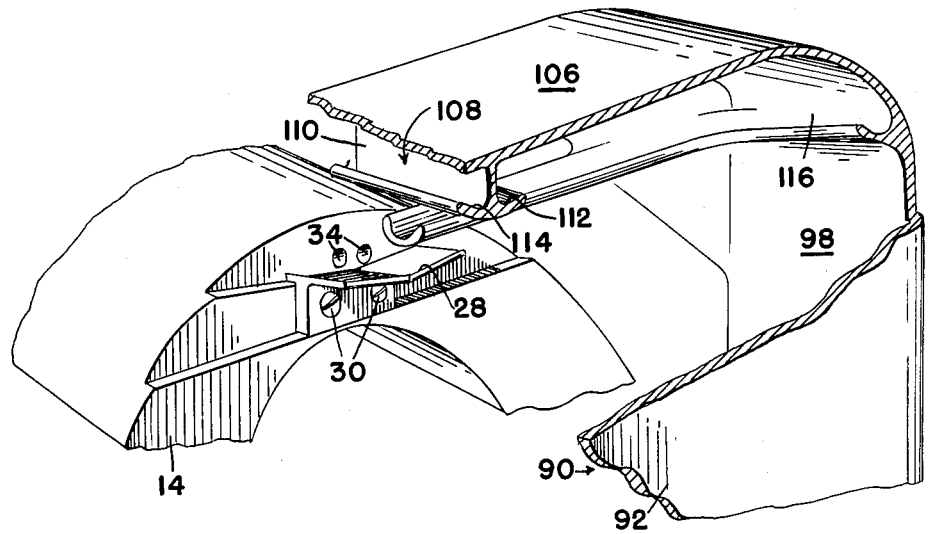
Fig. 3 is a partial view in perspective of certain of the parts of the novel lubricating system.
Figure 4:
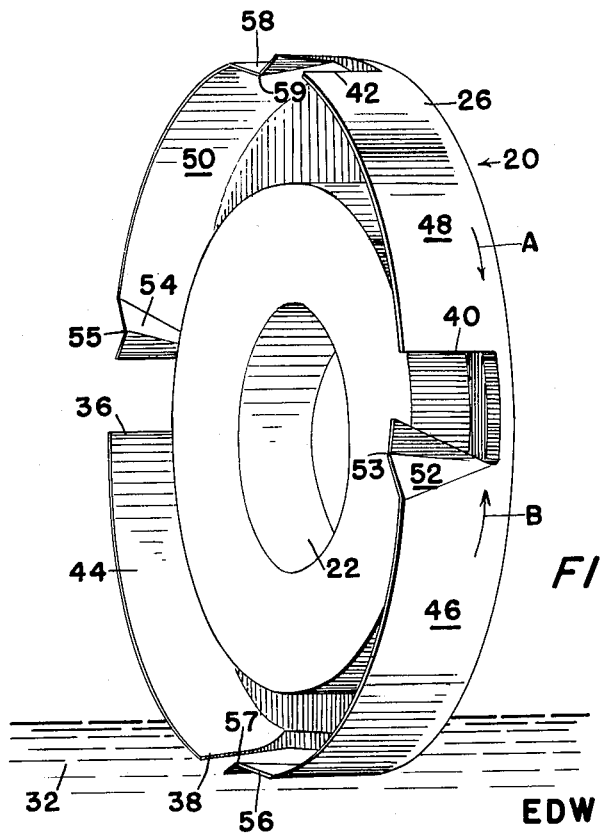
Fig. 4 is a perspective view of the oil conveying member of the invention.

In addition to the foregoing novel features, the invention also provides a highly efficient arrangement for conducting oil from the reservoir 32 to the ledge 28 under conditions of high speed operation of the journal 12 and the drum 20. As shown, such arrangement also provides a readily removable splash shield or guard construction for confining the distribution of the oil and for preventing flow thereof to the entrance opening 18. More particularly and as shown in Figs. 1 to 3, the foregoing comprises a splash shield and oil confining member 90 which includes a front shield 92 which interfits the forward edge 94 of the reservoir 32 at 96 to provide an oil-tight joint. The shield 92 is extended to provide side sections 98, the lower portions of which also interfit at 100 with the side edges of the reservoir 32. Preferably, the shield or guard 90 has a plurality of nuts 102 welded thereto for the reception of retaining screws 104 for retaining the member 90 in position after assembling thereof within the journal box 10, as shown in Figs. 1 and 2.

The shield member 90 is provided with a top portion 106 which bears against the upper portion of the journal box 10 and centrally of the top 106, there is positioned a splash guard 108 comprising a web 110 and a pair of troughs 112 and 114 which are inclined toward the rear and which overlie the ledge 28. Adjacent the top 106, the member 90 is also formed with an inclined trough 116 which is directed toward the ledge 28 and overlies the latter as clearly shown in Figs. 2 and 3. With such an arrangement, oil thrown from the drum 20 under the action of centrifugal force and during high speed operation of the journal 12 and the drum 20, will be collected in the trough 116 and will flow by gravity to the ledge 28. Oil will also be collected within the troughs 112 and 114 of the splash guard 102 and due to the inclination of such troughs, the oil will flow to the ledge 28. It will be understood from Fig. 2 that two troughs 116 are associated with the member 20 at the upper portion thereof so that one or the other of the troughs will be effective to conduct oil to the ledge 28 depending upon the direction of operation of the device. Preferably, the front face 92 of the member 90 may be provided with a series of heat radiating fins, not shown, in order to efficiently dissipate heat from the chamber 118 defined by the member 90. Also, one or more suitable handles may be provided on the front shield 92 to facilitate insertion and removal of the shield member 90.

From the foregoing, it will be readily seen that the present invention provides highly efficient delivery of oil to the journal 12 and the bearing 14 regardless of the speed of operation of the journal. This is achieved by the novel construction disclosed herein and including the oil collecting and delivering drum member 20 which is effective to deliver oil to the parts regardless of the direction of rotation of the journal. The particular arrangement of the vanes 52, 54, 56 and 58 and the inclined gutters 53, 55, 57 and 59 has been found to provide highly effective lubrication at slow speeds of operation and the use of the slots or openings 36, 38, 40 and 42 is effective to efficiently deliver oil to the parts at intermediate speeds when centrifugal force may somewhat offset the lubricating action of the vanes and gutters. At high speeds, the oil which clings to the periphery of the flange 26 of the drum 20 is thrown off under the action of centrifugal force and is collected by the troughs 116, 112 and 114 for delivery to the ledge 28 and thence to the relatively rotating parts by way of channels 34 and grooves 32.

As a further feature, the splash guard or shield member 90 confines the oil to the chamber 118 and thus prevents depletion of the oil supply from the reservoir 32 by reason of overflow or splash distribution to the bottom of the journal box 10 or through the entrance opening 18. In addition, the member 20 is so arranged that it may be readily assembled in engagement with the walls of the reservoir 32 and maintained in position by means of the screws 104. In the assembly and disassembly of the member 90, it will be readily understood that these operations may be readily effected after movement of the reservoir 32 to the left as illustrated in Fig. 1. The slip connection shown at 96 and the overlapping connection shown at 100 readily facilitate the insertion or removal of the member 20 from the journal box.

In addition to the above, the invention provides a novel and efficiently operable yieldable and releasable torque limiting clutch 60 between the journal 12 and the oil conveying drum 20 for avoiding any possibility of damage to the drum should the latter engage the journal box 10 in operation. The action of the clutch is such that during all normal operations, the drum 20 is frictionally driven by the journal in order to provide for efficient lubrication of the bearing 14. However, during conditions of misalignment of the journal and box when the drum 20 engages the box, the drive to the drum will be interrupted and no damage to the latter will result.

While the invention has been illustrated and described herein with considerable particularity, it will be readily understood by those skilled in the art that various modifications may be resorted to without departing from the spirit of the invention. For example, while four vanes have been illustrated as being embodied in the drum 20, it will be readily understood that this number may be varied if desired. Moreover, the circumferential width of the slots 36, 38, 40 and 42 may be varied to suit the viscosity of the oil utilized in order to insure proper lubrication at certain speeds of operation. Other changes and variations may be resorted to within the scope of the invention as defined in the appended claims.

What is claimed is:

1. In a journal box having an oil reservoir, a journal and a bearing for the journal, the improvement which comprises an oil conveying part secured to the bearing and extending outwardly from the end of the latter, and an oil conveying member secured to said journal and provided with an annular flange overlying said part and dipping into the oil in said reservoir, said flange being provided with a plurality of spaced-apart openings, portions of said flange, defining side edges of said openings, being directed inwardly to provide a plurality of triangular vanes for delivering oil from the reservoir to said part during rotation of the journal and member, the tips of each of said vanes being formed with an outwardly directed portion to provide a gutter in each vane, and said bearing having a passage for conducting oil from said part to said journal.

2. The improvement set forth in claim 1 wherein the oil conveying member is secured to said journal through a frictional connection.

3. The improvement set forth in claim 1 wherein the oil conveying member is secured to said journal through a frictional driving connection, said connection including a yieldable element.

4. In a journal box having an oil reservoir, a journal and a bearing for the journal, the improvement which comprises means including a ledge mounted on the bearing for conducting oil to the bearing and journal, and means to deliver oil from the reservoir to the ledge during rotation of the journal, comprising a member secured to said journal and provided with a plurality of spaced-apart arcuate sections adapted to dip into the oil in the reservoir and then overlie said ledge during rotation of the journal, the ends of a plurality of said sections being directed inwardly to provide substantially triangular vanes, and the tips of each of said vanes being directed outwardly to provide a gutter in each vane.

5. The improvement set forth in claim 4 wherein the oil conveying member is secured to said journal through a frictional connection.

6. The improvement set forth in claim 4 wherein the oil conveying member is secured to said journal through a frictional driving connection, said connection including a yieldable element.

7. In a journal box having an oil reservoir, a journal and a bearing for the journal, the improvement which comprises an oil collecting element mounted on the bearing for conducting oil to the bearing and journal, and means for delivering oil from said reservoir to said element at all speeds of rotation and irrespective of the direction of rotation of said journal, comprising an oil conveying member secured to said journal and having an axially directed flange adapted to dip into the oil in the reservoir and then overlie said element during rotation of the journal, said flange having a plurality of spaced-apart openings defining a plurality of separated arcuate sections, the opposite ends of a plurality of said sections being directed inwardly to provide triangular vanes and the tip portions of each vane being directed outwardly to form a gutter in each vane, and means positioned at the upper portion of the journal box for conducting oil thrown from said member by centrifugal force to said element.

8. The improvement set forth in claim 7 wherein the oil conveying member is secured to said journal through a frictional connection.

9. The improvement set forth in claim 7 wherein the oil conveying member is secured to said journal through a frictional driving connection, said connection including a yieldable element.

10. For use in the lubrication of bearings and journals, a rotatable oil conveying member having a central part provided with an annular flange having a plurality of spaced-apart openings in the flange, said openings dividing the flange into a plurality of separate and spaced-apart arcuate sections, the ends of a plurality of said arcuate sections being directed inwardly toward the center of the member and forming substantially triangular vanes, and the tips of each of the vanes being directed outwardly forming a gutter in each vane.

11. For use in the lubrication of bearings and journals, a rotatable oil conveying element adapted to be secured to the journal for rotation therewith, said element having a central part provided with an axially directed annular flange having a plurality of spaced-apart openings defining a plurality of separated arcuate sections, the opposite ends of a plurality of said sections being directed inwardly toward the center of the element forming triangular vanes, and the tips of each of said vanes being directed outwardly forming a gutter in each vane.

12. In a journal box having an oil reservoir, a journal and a bearing for the journal, the improvement which comprises means including an oil receiving part mounted on the bearing for conducting oil to the bearing and journal, an oil conducting member for conducting oil from said reservoir to said part, and means for supporting and for rotating said member comprising a releasable torque limiting cluch having frictional engagement with said journal and said member.

13. The improvement set forth in claim 12 which includes in addition, means for adjusting said clutch.

14. In a journal box having an oil reservoir, a journal and a bearing for the journal, the improvement which comprises means including an oil receiving part mounted on the bearing for conducting oil to the bearing and journal, an oil conducting member for conducting oil from said reservoir to said part, said member having a hub portion and an annular flange portion overlying said oil receiving part, and a yieldable clutch drivably connecting said member and journal, said clutch including a rubber collar positioned within said hub portion and frictionally engaging said hub portion and said member.

15. The improvement set forth in claim 14 which includes in addition, means for adjusting said clutch to vary the frictional engagement between the rubber collar and the hub portion and member.

16. In a journal box having an oil reservoir, a journal and a bearing for the journal, the improvement which comprises means including an oil receiving part mounted on the bearing for conducting oil to the bearing and journal, an oil conducting drum having a hub portion and an annular flage portion and supported solely by said journal for conducting oil from said reservoir to said part, the flange portion overlying said part and dipping into the oil in said reservoir, and a releasable torque limiting driving connection between the journal and drum for rotating said drum during normal rotation of the journal with the journal substantially aligned and centered in said journal box and for releasing said drum to allow relative rotation between the journal and drum when the journal and box are moved relatively to each other and the drum engages said box.

17. The improvement set forth in claim 16 wherein said driving connection includes a support member secured to the end of the journal, and a rubber collar surrounding said support member and positioned within said hub portion and having frictional engagement with the hub portion and the support member.

18. The improvement set forth in claim 17 which includes in addition, means for varying the frictional engagement between the rubber collar and the hub portion and support member.

References Cited in the file of this patent

UNITED STATES PATENTS

| | | |
|---|---|---|
| 151,642 | Whitaker | June 2, 1874 |
| 1,797,791 | Peyinghaus | Mar. 24, 1931 |
| 2,113,039 | Vigne | Apr. 5, 1938 |